(12) United States Patent
Heo et al.

(10) Patent No.: US 10,007,873 B2
(45) Date of Patent: Jun. 26, 2018

(54) MULTIFUNCTION SMART CARD

(71) Applicant: KT CORPORATION, Gyeonggi-do (KR)

(72) Inventors: Kook Heo, Seoul (KR); Sung-Chul Kim, Gyeonggi-do (KR); Youn-Pil Jeung, Gyeonggi-do (KR)

(73) Assignee: KT CORPORATION, Gyeonggi-do (KR)

( * ) Notice: Subject to any disclaimer, the term of this patent is extended or adjusted under 35 U.S.C. 154(b) by 78 days.

(21) Appl. No.: 13/949,657

(22) Filed: Jul. 24, 2013

(65) Prior Publication Data
US 2014/0027506 A1    Jan. 30, 2014

(30) Foreign Application Priority Data

Jul. 27, 2012    (KR) .................. 10-2012-0082567

(51) Int. Cl.
*G06K 19/06*    (2006.01)
*G06K 19/07*    (2006.01)
(Continued)

(52) U.S. Cl.
CPC ........... *G06K 19/0725* (2013.01); *G06K 5/00* (2013.01); *G06Q 20/322* (2013.01);
(Continued)

(58) Field of Classification Search
CPC ............... G06K 19/07; G06K 19/0723; G06K 19/0725; G06Q 20/322; G06Q 20/327;
(Continued)

(56) References Cited

U.S. PATENT DOCUMENTS 6,016,476 A    1/2000  Maes et al.
6,925,439 B1   8/2005  Pitroda
(Continued)

FOREIGN PATENT DOCUMENTS

EP    0949595 A2    10/1999
JP    2002-207970 A    7/2002
(Continued)

OTHER PUBLICATIONS

NFC Forum, "Type 4 Tag Operation Specification", Version 2.0, Jun. 28, 2011.
(Continued)

*Primary Examiner* — Thien M Le
*Assistant Examiner* — April Taylor
(74) *Attorney, Agent, or Firm* — IP Legal Services, LLC

(57) ABSTRACT

The disclosure is related to providing a payment processing service and a near field communication (NFC) tag processing service through the single smart card. The smart card may store identification (ID) information of one of a payment card and a NFC tag at a first memory sector and store associated information for providing a related service as the payment card and the NFC tag at predetermined memory sectors. The smart card may be also implemented with a NFC tag applet providing the ID information and the associated information as the NFC tag to the user terminal. The smart card may be recognized as the NFC tag while storing the ID information for the payment card at the first memory sector in the memory or as the payment card while storing the ID information for the NFC tag at the first memory sector in the memory.

19 Claims, 8 Drawing Sheets

(51) Int. Cl.
*G06K 5/00* (2006.01)
*G06Q 20/32* (2012.01)
*G06Q 20/34* (2012.01)

(52) U.S. Cl.
CPC ....... *G06Q 20/3278* (2013.01); *G06Q 20/352* (2013.01); *G06Q 20/353* (2013.01); *G06Q 20/3576* (2013.01)

(58) Field of Classification Search
CPC .. G06Q 20/3278; G06Q 20/34; G06Q 20/352; G06Q 20/357; G06Q 20/3574; G06Q 20/3576; G06Q 20/35765
USPC ...... 235/380, 381, 383, 492; 705/13, 35, 39, 705/41
See application file for complete search history.

(56) References Cited

U.S. PATENT DOCUMENTS

| | | | |
|---|---|---|---|
| 7,375,616 B2* | 5/2008 | Rowse et al. ................. | 340/10.1 |
| 7,395,241 B1 | 7/2008 | Cook et al. | |
| 7,478,054 B1 | 1/2009 | Adams et al. | |
| 7,562,818 B1 | 7/2009 | Bierbaum et al. | |
| 7,793,845 B2 | 9/2010 | Bonalle et al. | |
| 8,016,191 B2 | 9/2011 | Bonalle et al. | |
| 8,082,349 B1 | 12/2011 | Bhargava et al. | |
| 8,102,797 B2 | 1/2012 | Abel | |
| 8,121,945 B2 | 2/2012 | Rackley, III et al. | |
| 8,332,272 B2* | 12/2012 | Fisher ............................. | 705/16 |
| 8,393,545 B1 | 3/2013 | Mullen et al. | |
| 8,429,047 B2 | 4/2013 | Hurst | |
| 8,554,653 B2 | 10/2013 | Falkenborg et al. | |
| 8,744,906 B2 | 6/2014 | Fordyce, III et al. | |
| 8,788,418 B2 | 7/2014 | Spodak et al. | |
| 8,818,851 B2* | 8/2014 | Lee et al. ................... | 705/14.38 |
| 8,876,011 B2 | 11/2014 | Olson et al. | |
| 9,607,192 B2* | 3/2017 | Corda ................. | G06K 7/10237 |
| 2001/0037254 A1 | 11/2001 | Glikman | |
| 2002/0042743 A1 | 4/2002 | Ortiz et al. | |
| 2002/0139843 A1 | 10/2002 | Park et al. | |
| 2004/0238620 A1 | 12/2004 | Cohagan et al. | |
| 2007/0138302 A1 | 6/2007 | Antoniou | |
| 2007/0179885 A1 | 8/2007 | Bird et al. | |
| 2008/0099556 A1 | 5/2008 | Park | |
| 2008/0210751 A1 | 9/2008 | Kim | |
| 2008/0228567 A1 | 9/2008 | Williams et al. | |
| 2008/0228586 A1 | 9/2008 | Stoffelsma et al. | |
| 2008/0233880 A1 | 9/2008 | Rofougaran et al. | |
| 2008/0255962 A1 | 10/2008 | Chang et al. | |
| 2008/0306849 A1* | 12/2008 | Johnson, Jr. ............. | G06F 21/35 |
| | | | 705/35 |
| 2009/0006218 A1 | 1/2009 | Ku et al. | |
| 2009/0143104 A1* | 6/2009 | Loh et al. ...................... | 455/558 |
| 2009/0144164 A1 | 6/2009 | Wane et al. | |
| 2009/0247078 A1 | 10/2009 | Sklovsky et al. | |
| 2009/0256731 A1 | 10/2009 | Matsuo et al. | |
| 2010/0030636 A1 | 2/2010 | Vijayshankar et al. | |
| 2010/0078471 A1 | 4/2010 | Lin et al. | |
| 2010/0078472 A1 | 4/2010 | Lin et al. | |
| 2010/0082481 A1 | 4/2010 | Lin et al. | |
| 2010/0153279 A1 | 6/2010 | Zahn | |
| 2010/0211504 A1* | 8/2010 | Aabye ..................... | G06Q 20/10 |
| | | | 705/44 |
| 2010/0223111 A1 | 9/2010 | Maekawa | |
| 2010/0299527 A1 | 11/2010 | Arunan et al. | |
| 2010/0306080 A1 | 12/2010 | Trandal et al. | |
| 2011/0016275 A1* | 1/2011 | Lemonnier ......... | G06F 12/0238 |
| | | | 711/115 |
| 2011/0137994 A1 | 6/2011 | Kumar et al. | |
| 2011/0184857 A1 | 7/2011 | Shakkarwar | |
| 2012/0022945 A1 | 1/2012 | Falkenborg et al. | |
| 2012/0059702 A1 | 3/2012 | Yoder et al. | |
| 2012/0109764 A1* | 5/2012 | Martin ................. | G06Q 20/204 |
| | | | 705/17 |
| 2012/0150601 A1 | 6/2012 | Fisher | |
| 2012/0191612 A1 | 7/2012 | Spodak et al. | |
| 2012/0203697 A1 | 8/2012 | Morgan et al. | |
| 2012/0203701 A1 | 8/2012 | Ayuso de Paul | |
| 2012/0253970 A1 | 10/2012 | Ku et al. | |
| 2013/0060708 A1 | 3/2013 | Oskolkov et al. | |
| 2013/0086375 A1* | 4/2013 | Lyne ........................ | H04L 9/00 |
| | | | 713/153 |
| 2013/0124349 A1 | 5/2013 | Khan et al. | |
| 2013/0159186 A1 | 6/2013 | Brudnicki et al. | |
| 2013/0238492 A1 | 9/2013 | Muthu et al. | |
| 2013/0290184 A1 | 10/2013 | Shapiro et al. | |
| 2013/0304561 A1 | 11/2013 | Warner et al. | |
| 2013/0317924 A1* | 11/2013 | Bush .................. | G06Q 20/3278 |
| | | | 705/16 |
| 2013/0332356 A1 | 12/2013 | Park et al. | |
| 2014/0074575 A1 | 3/2014 | Rappoport | |
| 2014/0129308 A1 | 5/2014 | Rappoport | |
| 2014/0136417 A1* | 5/2014 | Spodak ............ | G06K 19/06187 |
| | | | 705/65 |
| 2014/0249904 A1 | 9/2014 | Nelsen et al. | |
| 2014/0351048 A1 | 11/2014 | Fordyce et al. | |
| 2016/0335619 A1 | 11/2016 | Ce | |

FOREIGN PATENT DOCUMENTS

| | | |
|---|---|---|
| JP | 2003-281437 A | 10/2003 |
| JP | 2008-065669 A | 3/2008 |
| JP | 2011-096021 A | 5/2011 |
| KR | 10-2001-0022217 A | 3/2001 |
| KR | 10-2002-0076406 A | 10/2002 |
| KR | 10-2004-0028110 A | 4/2004 |
| KR | 10-2004-0060249 A | 7/2004 |
| KR | 10-2005-0047154 A | 5/2005 |
| KR | 10-2005-0112484 A | 11/2005 |
| KR | 10-2007-0006503 A | 1/2007 |
| KR | 10-2007-0051519 A | 5/2007 |
| KR | 10-2008-0020153 A | 3/2008 |
| KR | 10-0823679 B1 | 4/2008 |
| KR | 10-2009-0039894 A | 4/2009 |
| KR | 10-2009-0041398 A | 4/2009 |
| KR | 10-2009-0054824 A | 6/2009 |
| KR | 10-2010-0072115 A | 6/2010 |
| KR | 10-2011-0031046 A | 3/2011 |
| KR | 10-2011-0051739 A | 5/2011 |
| KR | 10-2011-0056561 A | 5/2011 |
| KR | 10-2011-0082888 A | 7/2011 |
| KR | 10-2011-0089697 A | 8/2011 |
| KR | 10-2011-0112594 A | 10/2011 |
| KR | 10-2011-0115264 A | 10/2011 |
| KR | 10-2011-0125848 A | 11/2011 |
| KR | 10-2012-0002136 A | 1/2012 |
| KR | 10-2012-0064206 A | 6/2012 |
| KR | 10-1168272 B1 | 8/2012 |
| KR | 10-2012-0097157 A | 9/2012 |
| KR | 10-2012-0098978 A | 9/2012 |
| KR | 10-1265574 B1 | 5/2013 |
| WO | 2010/039337 A2 | 4/2010 |

OTHER PUBLICATIONS

Wikipedia, "Graphical user interface", https://en.wikipedia.org/wiki/Graphical_user_interface, Dec. 1, 2005.

* cited by examiner (A)    (B)

MULTIFUNCTION SMART CARD

CROSS REFERENCE TO PRIOR APPLICATIONS

The present application claims priority under 35 U.S.C. § 119 to Korean Patent Application No. 10-2012-0082567 (filed on Jul. 27, 2012), which is hereby incorporated by reference in its entirety.

BACKGROUND

The present disclosure relates to a contactless smart card, more particularly; to providing a payment service and a near field communication (NFC) tag service through single contactless smart card.

A contactless smart card is any pocket-sized card embedded with an integrated circuit (IC) chip capable of storing various types of digital information. Such smart card may be referred to as a chip card or an IC card. The smart card contains more information than a typical magnetic stripe card and can be programmed for different types of applications. Some cards contain programming and data to support multiple applications and some might be updated to add new applications after they are issued. Such a smart card may be referred to as a combi smart card. In general, the combi smart card includes a magnetic band, a contact IC, and a contactless chip on boards (COB) with a radio frequency (RF) antenna. The combi smart card may interact with a corresponding user terminal through the magnetic band or the contact IC in a contact interaction manner or through the contactless COB in a contactless interaction manner. Due to many advantages thereof, the combi smart card has been popularly used as a contactless payment card or a contact payment card, such as a credit card, a debit card, an identification card, an automated teller machine (ATM) card, and a payment card for public transportation.

In general, a typical combi smart card employs a MIFARE® chip, also referred to as a MIFARE® card. Although there are many different variants, a MIFARE® classic technique has been widely embodied in the typical combi smart card. Such a MIFARE® classic smart card stores information in a memory of a MIFARE® chip and interacts with a corresponding terminal (i.e., reader) based on International Standard Organization (ISO) 14443. In order to provide a specific service through such MIFARE® classic smart card, service identifier (ID) information is generally stored at the first memory sector (i.e., $0^{th}$ sector) of a memory for interaction between the MIFARE® classic smart card and the terminal (i.e., reader). Such a MIFARE® Classic memory structure of a typical smart payment card is also employed as a near field communication (NFC) tag memory format.

Particularly, the NFC forum provides various types of NFC tag formats, such as Type 1, Type 2, Type 3, Type 4, and NXP-specific type tag. Among them, a NXP-specific type tag employs the MIFARE® Classic memory structure. That is, a typical combi card has the same memory structure to a typical NFC tag. In order to use such the MIFARE® classic smart card as a NFC tag, a NFC data exchange format application ID (NDEF AID) needs to be stored in the first memory sector of the MIFARE® classic format memory, where the first memory sector is a MIFARE® Application Direction (MAD) and also referred to as a MAD sector. However, the first memory sector of the MIFARE® classic smart card as the payment card is occupied by corresponding payment service ID information. classic smart card as the payment card is occupied by corresponding payment service ID information.

SUMMARY

This summary is provided to introduce a selection of concepts in a simplified form that is further described below in the Detailed Description. This summary is not intended to identify key features or essential features of the claimed subject matter, nor is it intended to be used to limit the scope of the claimed subject matter.

Embodiments of the present invention overcome the above disadvantages and other disadvantages not described above. Also, the present invention is not required to overcome the disadvantages described above, and an embodiment of the present invention may not overcome any of the problems described above.

In accordance with an aspect of the present embodiment, a smart card may be used as a NFC tag as well as a payment service.

In accordance with another aspect of the present embodiment, a user terminal may provide a NFC tag processing service and a payment card processing service interact through single smart card.

In accordance with still another aspect of the present embodiment, a smart card may store NFC tag ID information at the first memory sector in a MAD formation while storing payment service ID information at predetermined memory sectors except the first memory sector.

In accordance with yet still another aspect of the present invention, a smart card may have payment service ID information stored at the first memory sector and include a NFC tag applet that enables a user terminal to recognize the smart card as a NFC tag and provides associated NFC tag content to the user terminal.

In accordance with at least one embodiment of the present invention, a smart card may include a memory and a control processor. The memory may be configured to store identification (ID) information of one of a payment card and a near field communication (NFC) tag at a first memory sector and to store associated information for providing a related service as the payment card and the NFC tag at predetermined memory sectors. The control processor may be configured to be implemented with a NFC tag applet that is invoked in response to an associated selection signal from the user terminal and provides the ID information and the associated information as the NFC tag to the user terminal.

The smart card may be configured to be recognized as the NFC tag while storing the ID information for the payment card at the first memory sector in the memory. Also, the smart card may be configured to be recognized as the payment card while storing the ID information for the NFC tag at the first memory sector in the memory.

The memory may be configured to store both of NFC tag ID information and payment service ID information as the ID information for the NFC tag and the payment card.

The memory may be configured to store NFC tag ID information at the first memory sector as the ID information for the NFC tag and to store payment service ID information as the ID information for the payment card and store associated payment information at predetermined memory sectors, except the first memory sector. The predetermined memory sectors may be defined and appointed by at least one of a related international smart card organization and a related service provider group. The memory may have a MIFARE® classic format and the first memory sector may be a MIFARE® Application identifier (MAD) sector.

The control processor may be configured to invoke the NFC tag applet in response to the selection signal that selects an application identifier of the NFC tag applet. The user terminal may transmit the selection signal when the memory stores payment service ID information at the first memory sector. The NFC tag applet may provide NFC tag ID information and associated NFC tag contents information to the user terminal. Such NFC tag applet may be a program implemented within the control processor based on related international smart card standards including Global Platform. The NFC tag applet may be implemented based on a NFC forum type 4 tag operation specifications. Also, the NFC tag ID information may be a NFC data exchange format application identifier (NEDF AID).

In accordance with another embodiment, a method of a user terminal may be provided for providing one of a payment processing service and a near field communication (NFC) tag processing service through single smart card. The method may include i) recognizing the smart card as a NFC tag when identification (ID) information of a payment card is stored in a first memory sector of a memory in the smart card and ii) recognizing the smart card as a payment card when ID information of a NFC tag is stored in the first memory sector of the memory in the smart card.

In accordance with still another embodiment, a user terminal may be provided for providing a payment processing service and a near field communication (NFC) tag processing service through single smart card. The user terminal may include a sensor, a payment card processor, and a NFC tag processor. The sensor may be configured to regularly scan surrounding area for sensing the smart card and to transmit an activation signal according to an operation mode of the user terminal. The payment card processor may be configured to be activated in response to the activation signal from the sensor when the operation mode of the user terminal is a payment processing mode and to recognize the smart card as a payment card when identification (ID) information of a NFC tag is stored in a first memory sector of a memory in the smart card. The NFC tag processor may be configured to be activated in response to the activation signal from the sensor when the operation mode of the user terminal is a NFC tag processing mode and to recognize the smart card as a NFC tag when ID information of a payment card is stored in the first memory sector of the memory in the smart card.

BRIEF DESCRIPTION OF THE DRAWINGS

The above and/or other aspects of the present invention will become apparent and more readily appreciated from the following description of embodiments, taken in conjunction with the accompanying drawings, of which.

DESCRIPTION OF EMBODIMENTS

Figure 1:
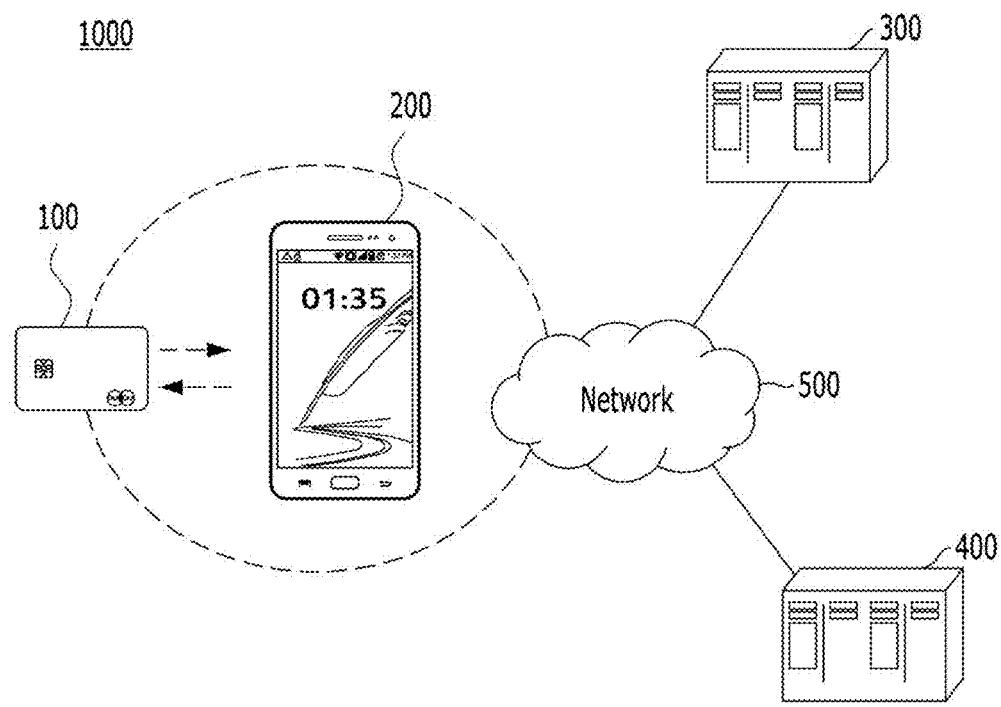
FIG. 1 illustrates a multifunction smart card service system in accordance with at least one embodiment of the present invention.

Reference will now be made in detail to embodiments of the present invention, examples of which are illustrated in the accompanying drawings, wherein like reference numerals refer to like elements throughout. The embodiments are described below, in order to explain the present invention by referring to the figures.

In accordance with at least one embodiment, a single smart card may be recognized as a payment card and a NFC tag. Such smart card may have a MIFARE® Classic format memory and store a NDEF AID in a MAD format at the first sector thereof while storing payment service ID information and associated payment information at other sectors, which might be decided and appointed by a related standard organization or an associated service provider group. Alternatively, a smart card may have a NFC tag applet implemented based on an international smart card standard, Global Platform, while storing payment service ID information at the first sector in the MIFARE® Classic format memory. In order to provide the payment processing service and the NFC tag processing service through single smart card, a user terminal in accordance with at least one embodiment may obtain required information directly from the first memory sector and from associated memory sectors or may obtain necessary information through an initiated NFC tag applet. Then, the user terminal may recognize the single smart card differently according to the obtained information, such as a payment card or a NFC tag. The smart card and the user terminal in accordance with at least one embodiment will be described as providing a payment processing service with a NFC tag processing service for convenience and ease of understanding, but the present invention is not limited thereto. The smart card and the user terminal in accordance at least one embodiment may be applied similarly to providing other services with the NFC tag processing service. Hereinafter, a multifunction smart card service system for providing a payment service and a NFC tag service through single smart card in accordance with at least one embodiment will be described with reference to FIG. 1.

FIG. 1 illustrates a multifunction smart card service system in accordance with at least one embodiment.

Referring to FIG. 1, multifunction smart card service system 1000 may include multifunction smart card 100, user terminal 200, payment processing server 300, NFC tag processing server 400, and communication network 500 in accordance with at least one embodiment. Such multifunction smart card service system 1000 may provide multiple services including a payment processing service and a NFC tag processing service through single smart card, multifunction smart card 100. Although multifunction smart card system 1000 can be used to provide many different services with a NFC tag service, multifunctional smart card system 100 will be described to provide the payment service with the NFC tag service for convenience and ease of understanding.

Such multifunction smart card 100 may be a contactless smart card capable of providing multiple services including a payment processing service and a NFC tag processing service. Multifunction smart card 100 may employ a MIFARE® Classic memory structure and store information at predetermined sectors defined by a related standard organization or an associated service provider group.

That is, multifunction smart card 100 may be recognized as a payment card. The payment card may be a card that can be used by a cardholder and accepted by a merchant to make a payment for a purchase. The payment card may be a credit card, a check card, a debit card, a bank card, a charge card, an automated teller machine (ATM) card, a public transportation payment card, and so forth. As the payment card, multifunction smart card 100 may store payment service identifier (ID) information at a predetermined memory sector (i.e., the first memory sector: S0) to be recognized as the payment card. Further, multifunction smart card 100 store associated payment information at predetermined memory sectors mapped to the payment service ID information and provide the stored payment information to user terminal 200 to make a payment for a purchase. Such payment information may include information on a credit card identification number, a payment service identifier (ID), an associated bank account, a remaining money, and so forth.

Furthermore, multifunction smart card 100 may be recognized as a NFC tag. The NFC tag may store information (i.e., NFC tag content) and provide the stored information to user terminal 200 through near field communication (NFC). The NFC tag may be updated to store new information or to modify existing information. The NFC tag service reads a NFC tag and obtains stored information therein. Furthermore, the NFC tag service writes new information in the NFC tag and updates the existing information stored in the NFC tag. As the NFC tag, multifunction smart card 100 stores NFC data exchange format application ID (NDEF AID) at the first memory sector (S0) in a MAD format. Further, multifunction smart card 100 may store associated tag content information at predetermined memory sectors. In this case, payment service ID information may be stored in other memory sectors, except the first memory sector (i.e., MAD sector). For example, such memory sectors are the $14^{th}$ and the $15^{th}$ memory sectors, but the present invention is not limited thereto. Alternatively, multifunction smart card 100 includes a NFC tag applet implemented based on international smart card standards, Global Platform when the payment service ID information is stored at the first memory sector. The NFC tag applet may be initiated and provide tag content information to user terminal 200 in accordance with at least one embodiment.

Multifunction smart card 100 may include an integrated circuit (IC) chip with a memory and a radio frequency (RF) antenna for communicating with user terminal 200 in a contactless manner. For example, multifunction smart card 100 includes a MIFARE® chip with a memory or employs MIFARE® classic technology for interacting with user terminal 200. Accordingly, multifunction smart card 100 has a MIFARE® Classic format memory. Particularly, contactless interaction between multifunction smart card 100 and user terminal 200 is performed based on ISO 14333. The present invention, however, is not limited thereto. Such structure and operation of multifunction smart card 100 will be described in more detail with reference to FIG. 4, FIG. 5, and FIG. 6

User terminal 200 may interact (i.e., communicate) with multifunction smart card 100 in a contactless manner (i.e., near field communication) in order to provide a payment service and a NFC tag service through single multifunction smart card 100 in accordance with at least one embodiment. User terminal 200 may recognize multifunction smart card 100 as a payment card or a NFC tag according to an operation mode of user terminal 200, for example, a payment service mode and a NFC tag service mode.

Particularly, when user terminal 200 operates as a payment service mode, user terminal 200 may recognize multifunction smart card 100 as a payment card. That is, user terminal 200 may read payment service ID information from a predetermined memory sector (i.e., the first sector) of multifunction smart card 100 and obtain payment information from predetermined memory sectors mapped to the payment service ID information. When the payment service ID information is not stored in the predetermined memory sector (i.e., the first sector), user terminal 200 may obtain payment information from other memory sectors such as $14^{th}$ or $15^{th}$ memory sectors, which are previously assigned by an associated service provider group or an associated standard organization. User terminal 200 may process the obtained payment information in connection with payment processing server 300 to make a payment for a purchase through multifunction smart card 100. Such operation will be described in detail with reference to FIG. 2

When user terminal 200 operates as a NFC tag mode, user terminal 200 may recognize multifunction smart card 100 as a NFC tag. That is, user terminal 200 may read NDEF AID from the first memory sector of multifunction smart card 100 and obtain tag content information from predetermined memory sectors associated with the NDEF AID. When the NDEF AID is not stored in the predetermined memory sector (i.e., the first sector), user terminal 200 may initiate a NFC tag applet by selecting an associated application ID. The NFC tag applet may be a program designed and implemented based on Global Platform to be executed from a corresponding application (i.e., processor) of user terminal 200 for enabling user terminal 200 to recognize multifunction smart card 100 as a NFC tag and to obtain the NFC tag content from multifunction smart card 100. Such NFC tag applet may be implemented in multifunction smart card 100 and initiated by selecting an application ID thereof in cooperation with an operating system of multifunction smart card 100. Particularly, the NFC tag applet may be implemented based on NFC forum type 4 tag operation specifications. User terminal 200 might select an application ID associated with the NFC tag applet to invoke the NFC tag applet. The initiated NFC tag applet may obtain an associated NFC tag content stored in predetermined memory sectors in multifunction smart card 100 and provide the obtained NFC tag content to user terminal 200.

User terminal 200 may obtain tag content information through the NFC tag applet in accordance with at least one embodiment. User terminal 200 may process the obtained tag content information in connection with NFC tag processing server 400 to perform operation associated with tag content information. For example, user terminal 200 may determine a content type of the obtained tag content information and perform operation based on the determined content type. For example, user terminal 200 may display a web page, a picture, a text, or play back a song based on the obtained tag content information in connection with NFC tag processing server 400. Furthermore, user terminal 200 may update tag content information stored in multifunction smart card 100 based on the obtained tag content information. Such operation will be described in detail with reference to FIG. 3.

Such user terminal 200 may be any device capable of communicating with an associated server through communication network 500, communicating with multifunction smart card 100 through near field communication, and processing data based on information obtained from multifunction smart card 100. For example, user terminal 200 may include a small sized computing device having a NFC function, a laptop computer having a NFC function, a handheld device having a NFC function, a smart phone having a NFC function, and so forth. Furthermore, user terminal 200 may be a terminal dedicated to provide only one of the payment service and the NFC tag service. For example, user terminal 200 may be a point of sale (POS) terminal, a cash register, or a NFC reader or writer.

Payment processing server 300 may be a server of a payment service provider. Payment processing server 300 may receive the payment information from user terminal 200 and process electronic payments made through multifunction smart card 100 based on the received payment information in connection with user terminal 200. Such payment processing server 300 may perform various operations for processing such payments by exchanging messages with user terminal 200. For example, payment processing server 300 may be a server of a bank, a server of a credit card company, or a server of a value added network company. Such payment processing server 300 may be coupled to user terminal 200 through communication network 500.

NFC tag processing server 400 may be a server of a NFC tag service provider such as a contents provider that provides web contents, songs, documents, images, moving pictures, and so forth which are associated to the NFC tag. For example, user terminal 200 reads NFC tag contents stored in predetermined memory sectors of multifunction smart card 100 and request corresponding contents to NFC tag processing server 400 through network 500. NFC tag processing server 400 may receive such content request from user terminal 200 and provide the requested content to user terminal 200. User terminal 200 may perform various types of operations including displaying and playing back the contents received from NFC tag processing server 400 as the NFC tag service.

As described, a payment processing service and a NFC tag processing service may be provided through multifunction smart card 100 in accordance with at least one embodiment of the present invention. For ease of understanding, using multifunction smart card 100 as a credit card will be described with reference to FIG. 2.

Figure 2:
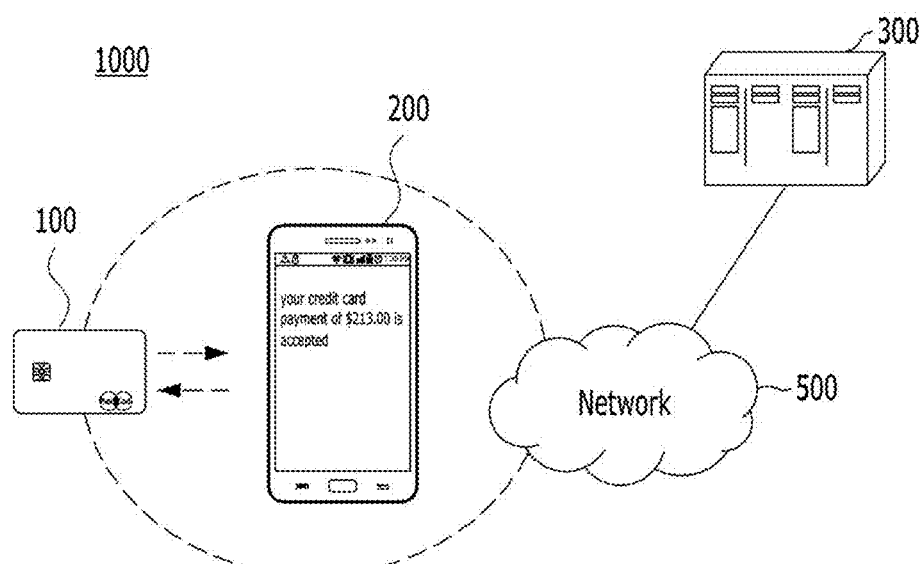
FIG. 2 illustrates a payment service provided through a multifunction smart card in accordance with at least one embodiment of the present invention.

FIG. 2 illustrates a payment processing service provided through a multifunction smart card in accordance with at least one embodiment of the present invention.

Referring to FIG. 2, a purchaser may use multifunction smart card 100 as a credit card to pay his or her purchase. In this case, the purchaser touches multifunction smart card 100, as the credit card, to user terminal 200. User terminal 200 detects multifunction smart card 100 is within a predetermined distance. User terminal 200 recognizes multifunction smart card 100 as a payment card by reading payment service ID information from the first memory sector of multifunction smart card 100. Then, user terminal 200 may obtain associated payment information from predetermined memory sectors mapped to the payment service ID information.

When the payment service ID information is not stored in the first memory sector, user terminal 200 may obtain payment service ID information and associated payment information from other memory sectors which are decided and appointed by a related standard association or an associated service provider group in accordance with at least one embodiment. Such decided and appointed memory sectors may be any memory sectors of a memory of multifunction smart card 100, except the first memory sector.

User terminal 200 may extract necessary information from the obtained payment information to process the payment made through multifunction smart card 100. That is, user terminal 200 extract a credit card type, a credit card number, a name of the cardholder, an expiration date, a security code, and so forth. After extracting the information, user terminal 200 accesses payment processing server 300 and transmit the extracted information to payment processing server 300 through network 500. That is, user terminal 200 performs operations for processing the payment in in cooperation with payment processing server 300. After processing, user terminal 200 may display an approval message such as "your credit card payment is accepted" on a display of user terminal 200 as shown in FIG. 2.

As described, multifunction smart card 100 can be recognized as a NFC tag as well as a payment card and a NFC tag service can be provided based on tag content information obtained from multifunction smart card 100 in accordance with at least one embodiment of the present invention. For ease of understanding, using multifunction smart card 100 as a NFC tag will be described with reference to FIG. 3.

Figure 3:
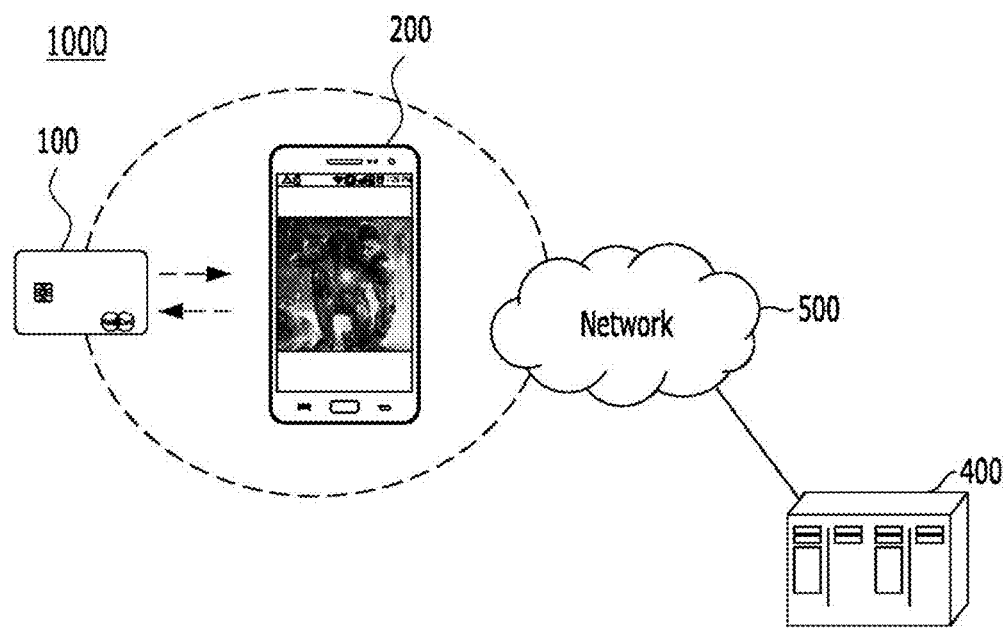
FIG. 3 illustrates a NFC tag service provided through a multifunction smart card in accordance with at least one embodiment of the present invention.

FIG. 3 illustrates a NFC tag processing service provided through a multifunction smart card in accordance with at least one embodiment of the present invention.

Referring to FIG. 3, when a user wants to read content in multifunction smart card, the user may operate user terminal 200 as a NFC tag processing mode in accordance with at least one embodiment. For example, a user may activate a NFC tag processor of user terminal 200 or invoke a NFC tag processing application implemented within an operating system of user terminal 200, such as a software program.

If the user touches multifunction smart card 100 to user terminal 200, user terminal 200 detects multifunction smart card 100 and may read a NDEF AID (i.e., a NFC tag ID) from the first memory sector (i.e., a MAD sector) of multifunction smart card 100. Then, user terminal 200 obtains tag content information from predetermined memory sectors associated with the NDEF AID. When the NDEF AID is not stored in the first memory sector, user terminal 200 may initiate a NFC tag applet implemented in multifunction smart card 100 and obtain tag content information through the NFC tag applet in accordance with at least one embodiment.

User terminal 200 may determine a content type of the obtained tag content information and perform an operation associated with the determined content type. User terminal 200 might process the obtained tag content information in connection with NFC tag processing server 400 to perform operation associated with tag content information. For example, the obtained NFC tag content information may be various types of information such as a set of text sentences, a moving picture, a still image, a short text, a song, a musical tone, a web address, and a set of instructions, but the present invention is not limited thereto.

When the content type of the obtained NFC tag content is a web address such as a universal resource locator (URL) address, user terminal 200 may access a related server (i.e., server 400) of the web address, receives web contents from the related server, and displays the web contents on a display of user terminal 200. Such determined content type may be a set of instructions to perform specific operation. In this case, user terminal 200 may perform operations in cooperation with related server 400 based on the set of instructions as shown in FIG. 3. For example, user terminal 200 accesses content server 400, requests specific contents (e.g., an advertisement movie clip), obtains the requested contents from server 400, and displays the received advertisement movie clips and plays sounds thereof as shown in FIG. 3.

As described, multifunction smart card 100 may be a contactless smart card capable of providing multiple services including a payment service and a NFC tag service. That is, multifunction smart card 100 may be recognized as a payment card and a NFC tag according to an operation mode of user terminal 200 in accordance with at least one embodiment. Multifunction smart card 100 may employ a MIFARE® Classic memory structure and store information at predetermined sectors defined by an associated organization or an associated service provider group. Hereinafter, such multifunction smart card 100 will be described in more detail with reference to FIG. 4.

Figure 4:
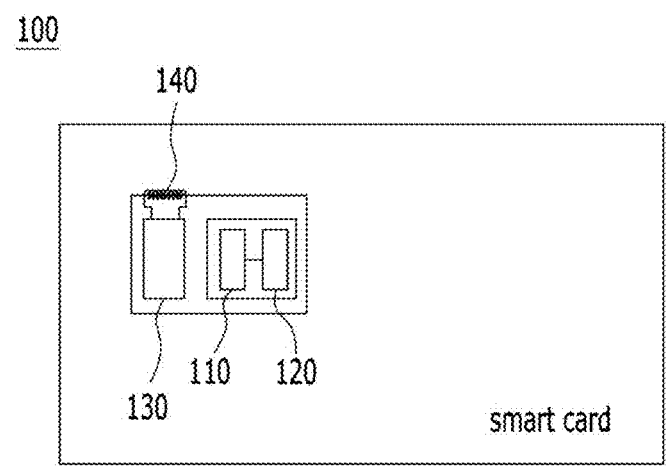
FIG. 4 shows a structure of a multifunction smart card in accordance with at least one embodiment.

FIG. 4 shows a structure of a multifunction smart card in accordance with at least one embodiment.

Referring to FIG. 4, multifunction smart card 100 may include control processor 110, memory 120, radio frequency (RF) interface processor 130, and RF antenna 140. Such constituent elements of multifunction smart card 100 may be designed to interact with each other based on related International standards or a common chip set design. For example, multifunction smart card 100 may employ a MIFARE® chip structure and Global Platform standards. Each of constituent elements may be designed to have a structure and to interact with each other based on the MIFARE® chip structure and Global Platform standards.

Memory 120 may store necessary information to be recognized as a payment card and a NFC tag and to provide a payment service and a NFC tag service through a single smart card in accordance with at least one embodiment. In order to store such information, memory 120 may have a specific memory format and store the information at predetermined memory sectors which are decided and appointed by a related international standard organization and a related service provider group. For example, memory 120 has a MIFARE® Classic memory structure. The predetermined memory sector for the payment service ID information and NFC tag ID information in the MIFARE® classic memory may be the first memory sector, which is the $0^{th}$ sector. When the first memory sector is occupied by the NFC tag ID information, other memory sectors such as the $14^{th}$ memory sector and $15^{th}$ memory sector might be used to store the payment service ID information and associated payment information. Such structure will be described in more detail with reference to FIG. 5 and FIG. 6.

In particular, in order to be recognized as the payment card and to provide the payment service, memory 120 is constructed with a MIFARE® classic memory structure; stores payment service ID information at the first memory sector (i.e., the $0^{th}$ sector); and stores payment information at memory sectors mapped to the payment service ID information. The payment service ID information is stored in a format different according to an associated service provider. Since the first memory sector is occupied by the payment service ID information, memory 120 may provide NFC tag information through a NFC tag applet.

Alternatively, memory 120 may store the payment service ID information and the payment information at specific memory sectors which are defined and appointed by related service providers. The specific memory sectors may be the $14^{th}$ memory sector and the $15^{th}$ memory sector, but the present invention is not limited thereto. In this case, the first memory sector is used to store a NDEF AID for the NFC tag service.

Fore recognition as the NFC tag and to provide the NFC tag service, memory 120 has a MIFARE® classic memory structure and stores a NDEF AID at the first memory sector, known as a MAD sector. In this case, the payment service ID information is stored in the specific memory sectors for example, the $14^{th}$ and the $15^{th}$ sectors.

When memory 120 stores the payment service ID information at the first memory sector, NFC tag content information stored in memory 120 may be provided through a NFC tag applet implemented in multifunction smart card 100 based on International smart card standards, including Global Platform. The NDEF AID and the corresponding tag content information may be provided through the NFC tag applet.

Although it is not shown in FIG. 4, memory 120 may include a random access memory (RAM), a read only memory, and an electrically erasable and programmable read only memory (EEPROM). The structure of memory 112 will be described in more detail with reference to FIG. 5 and FIG. 6.

Control processor 110 may perform general operations for providing the payment processing service and the NFC tag processing service in cooperation with user terminal 200. For example, control processor 110 may receive a request message for information stored in memory 120 from user terminal 200 through RF interface processor 130. In response to the request message, control processor 110 may retrieve the requested information from memory 120 and provide the retrieved information to user terminal 200 through RF interface processor 130. Such requested information may include the payment service ID information, the payment information, the NDEF AID, and the NFC tag content.

Control processor 110 may process payment information stored in memory 120 for performing a payment processing service in cooperation with user terminal 200. Furthermore, control processor 110 may process the NFC tag content information for providing a NFC tag service in cooperation with user terminal 200. For example, control processor 110 may read the NFC tag content information stored in memory 120 and provide the NFC tag content information to user terminal 200. Control processor 110 may write new NFC tag content information at a predetermined memory sector in response to the control of user terminal 200.

Control processor 120 may be implemented with a NFC tag applet based on related international smart card standards such as Global Platform. For example, the NFC tag applet may be a program designed and implemented based on Global Platform to be executed from a corresponding application such as a NFC tag processing application or a NFC tag processor implemented in user terminal 200. The NFCT tag applet may enable user terminal 200 to recognize multifunction smart card 100 as a NFC tag and to obtain the NFC tag content from multifunction smart card 100. Such NFC tag applet may be invoked by selecting an associated application ID thereof in cooperation with an operating system of multifunction smart card 100. Particularly, the NFC tag applet may be implemented based on NFC forum type 4 tag operation specifications. In addition, control processor 110 may perform an authentication procedure for verifying user terminal 200 and for accessing information stored in memory 120. Although not shown in FIG. 4, control processor 110 may include a central processing unit (CPU) and a network processing unit (NPU).

RF interface processor 130 may transmit and receive data with user terminal 200 through RF antenna 140. For example, RF interface processor 130 may communicate with user terminal 200 in a contactless manner based on NFC. RF interface processor 130 may employ ISO 14443 for communication to user terminal 200. Although not shown in FIG. 4, RF interface processor 130 may further include a MODEM, a voltage regulator, and a clock generator.

As described, memory 120 of multifunction smart card 100 may store ID information for recognition as a payment card and a NFC tag. Alternatively, memory 120 may store payment service ID information to be recognized as a payment card while a NFC tag applet is implemented in multifunction smart card 100. Furthermore, memory 120 may store payment information and NFC tag content information for providing both of a payment service and a NFC tag service in accordance with at least one embodiment. In order to store such information at single smart card (i.e., multifunction smart card 100), memory 120 has a specific memory structure. Such memory structure of memory 120 will be described in more detail with reference to FIG. 5 and FIG. 6.

Figure 5:
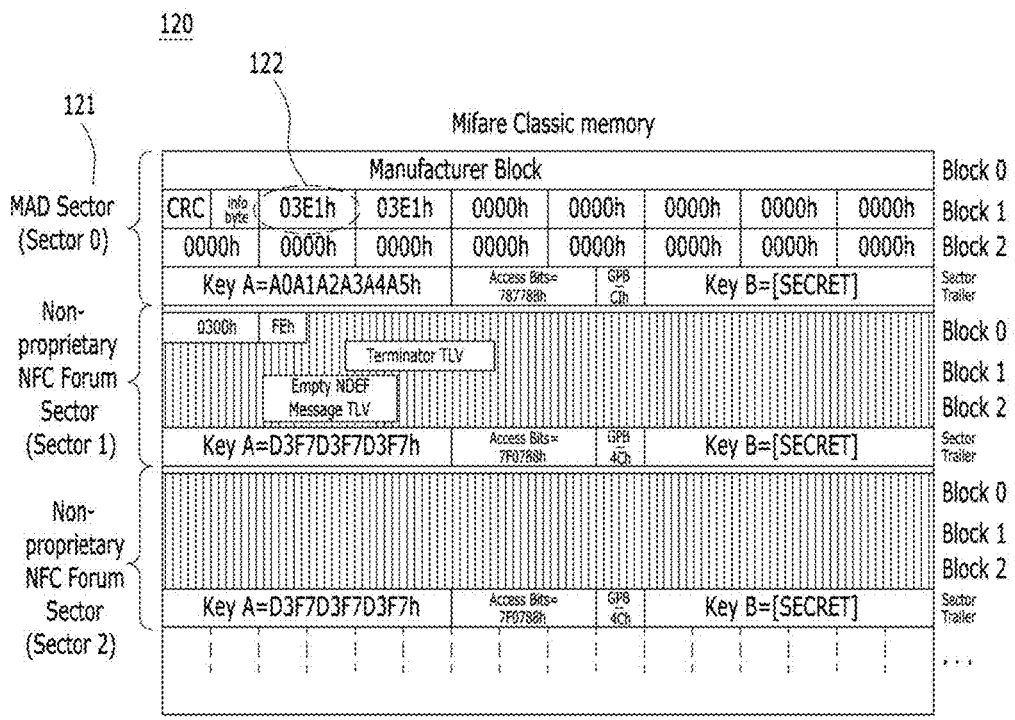
FIG. 5 shows a FIG. 5 shows a MIFARE® Classic memory structure adapted in a multifunction smart card in accordance with at least one embodiment of the present invention.

FIG. 5 shows a MIFARE® Classic memory structure adapted in a multifunction smart card in accordance with at least one embodiment of the present invention.

Referring to FIG. 5, memory 120 may have a MIFARE® classic memory structure. Such a MIFARE® classic memory structure may be configured of 16 sectors (i.e., sector 0 to sector 15). Each sector has four blocks (i.e., block 0 to block 2 and sector trailer) and each block is configured of 16 bytes. Particularly, memory 120 having the MIFARE® classic memory structure may include a MIFARE® Application Directory (MAD) at first memory sector 121 (i.e., sector 0) as shown in FIG. 5. The MAD defines common data structures for card application directory entries, allowing user terminals to identify the right card (and the right memory sector within the card) without the need to perform a comprehensive search through all cards' memories until the appropriate application is found.

In order to enable user terminal 200 to recognize multifunction smart card as a NFC tag, multifunction smart card 100 stores NFC tag ID 122 such as an NDEF AID at a MAD sector (i.e., first memory sector 121) in a MAD format. For example, 03Eih, as the NDEF AID, is stored at first memory sector 121 in the MAD format as shown in FIG. 5. In this case, user terminal 200 recognizes multifunction smart card 100 as the NFC tag.

Typically, a payment card generally employs the same memory structure, the MIFARE® classic memory structure, and stores payment service ID information in first memory sector 121 (i.e., sector 0) in various formats which might be defined and appointed by a related service provider. In this case, such a payment card cannot be recognized as the NFC tag although it has the same memory structure and the same technology for interaction, such as ISO 14333.

In accordance with at least one embodiment, memory 120 of multifunction smart card 100 may store such payment service ID information at predetermined memory sectors which might selected and appointed by a related standard organization or an associated service provider group while storing the NFC tag ID (i.e., NDEF AID) at first sector 120. The predetermined memory sectors may be any memory sectors in memory 120 except the first memory sector 121. In this way, multifunction smart card 100 can be recognized as the NFC tag and the payment card at the same time.

In accordance with another embodiment, memory 120 of multifunction smart card 100 may store payment service ID information at first sector 121 and include a NFC tag applet implemented therein based on the international smart card standard Global Platform. Such NFC tag applet may be initiated and enable user terminal 200 to recognize multifunction smart card 100 as the NFC tag. In this way, multifunction smart card 100 can be also recognized as the NFC tag and the payment card at the same time.

Figure 6:
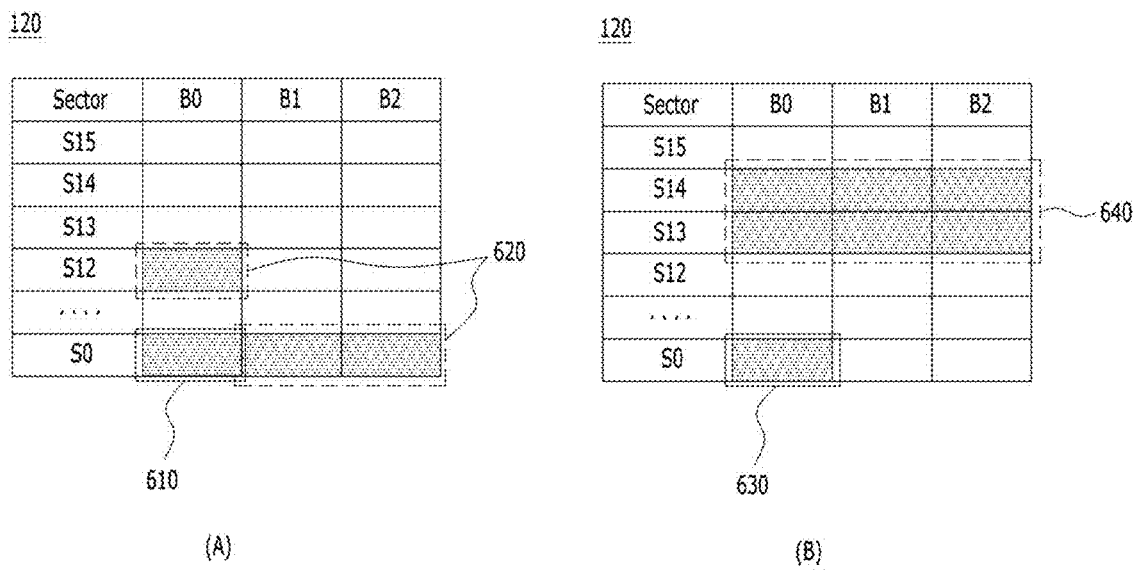
FIG. 6 shows memory sectors storing payment service ID information and NFC tag ID information in accordance with at least one embodiment.

FIG. 6 shows memory sectors storing payment service ID information and NFC tag ID information in accordance with at least one embodiment.

Particularly, a diagram (a) of FIG. 6 shows that memory 120 stores the payment service ID information at first block 610 of first memory sector S0 and stores payment information at blocks 620 of first memory sector S0 and S12. Since first memory sector S0 is occupied by payment service ID information, a NFC tag applet may be implemented in malfunction smart card 100 in accordance with at least one embodiment of the present invention.

In this way, a payment service and a NFC tag service can be provided through single smart card in accordance with at least one embodiment. For example, when user terminal 200 operates as a NFC tag processing mode, a NFC tag processor or a NFC tag processing application may initiate the NFC tag applet and user terminal 200 recognizes multifunction smart card 100 as the NFC tag by the initiated NFC tag applet and obtains NFC tag content from multifunction smart card 100 through the NFC tag applet. When user terminal 200 operates as a payment processing mode, user terminal 200 reads information stored in first block 610 of first memory sector S0 and recognizes multifunction smart card 100 as a payment card. User terminal 200 obtains associated payment information stored in blocks 620 memory sectors S0 and S12, which are mapped to the payment service ID information. Although the payment information is described as being stored in memory sectors S0 and S12, the present invention is not limited thereto. Such memory sectors for payment information might be decided and appointed by a related standard organization or an associated service provider group. Further, such payment ID information and the payment information are stored in various formats which are also defined by associated service providers.

A diagram (b) of FIG. 6 shows that memory 120 stores the NFC tag ID information at first block 630 of first memory sector S0 in order to enable user terminal 200 to recognize multifunction smart card 100 as the NFC tag. In order to enable user terminal 200 to recognize multifunction smart card 100 as the payment card, memory 120 may store the payment service ID information and the associated payment information at blocks 640 of predetermined memory sectors S13 and S14, except the first memory sector S0.

Through such way of storing the NFC tag ID information and the payment service ID information, a payment service and a NFC tag service can be provided through single smart card in accordance with at least one embodiment. For example, when user terminal 200 operates as a NFC tag processing mode, user terminal 200 reads a NDEF AID from first memory sector S0 and recognizes multifunction smart card 100 as the NFC tag. User terminal 200 also obtains NFC tag content based on the read NDEF AID. When user terminal 200 operates as a payment card processing mode, user terminal 200 reads payment service ID information and payment information from predetermined memory sectors such as the $14^{th}$ and $15^{th}$ memory sectors (S13 and S14). Such payment service ID information and payment information may be mapped to each other. Although the payment information is described as being stored in memory sectors S13 and S14, the present invention is not limited thereto. Any memory sectors among $16^{th}$ memory sectors, except the $1^{st}$ memory sector, might be decided and appointed by a related standard organization or an associated service provider group for storing the payment service ID information and the associated payment information.

In accordance with at least one embodiment, user terminal 200 may operate in two modes, a payment processing mode and a NFC tag processing mode, and provide a payment processing service and a NFC tag processing service through single smart card in cooperation with a related server. Such operation of user terminal 200 will be described in detail with reference to FIG. 7.

Figure 7:
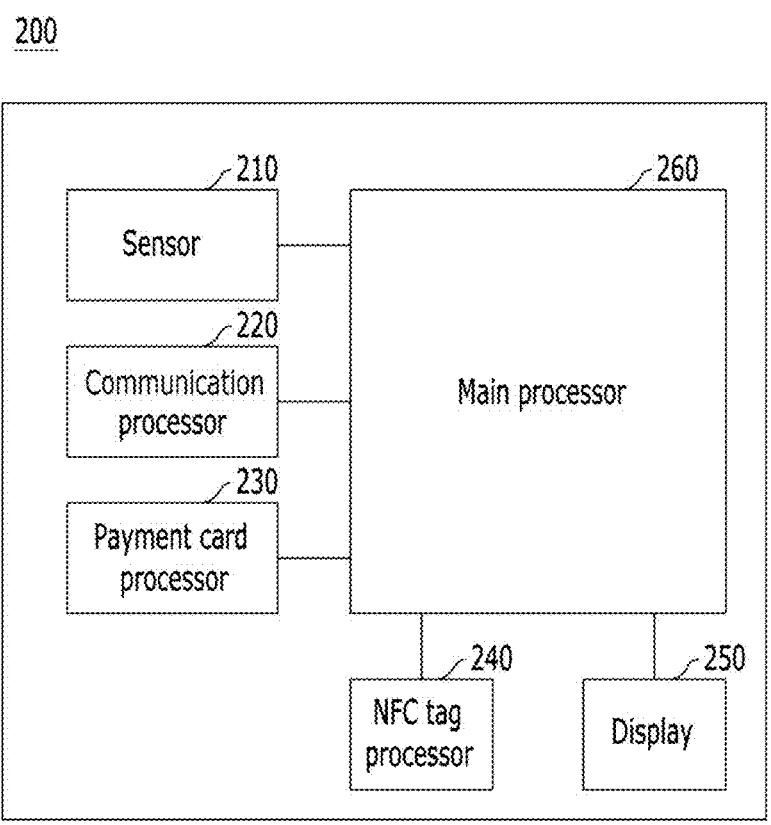
FIG. 7 shows a user terminal for providing multiple services through single smart card in accordance with at least one embodiment of the present invention.

FIG. 7 shows a user terminal for providing multiple services through single smart card in accordance with at least one embodiment of the present invention.

Referring to FIG. 7, user terminal 200 may be any computing device capable of communicating with an associated server and multifunction smart card 100. For example, user terminal 200 may be a personal computer, a laptop computer, a tablet PC, a pad-like device, a smart phone, and so forth. Furthermore, user terminal 200 may be a dedicated device for processing a payment card or for reading and writing NFC tag contents. For example, user terminal 200 may be at least one of a point of sale (POS) terminal, a cash register, a banking machine, as a dedicated device for processing a payment card. User terminal 200 may be a NFC card reader, or a NFC card scanner as a dedicated device for reading and writing NFC tag contents. In accordance with at least one embodiment, such user terminal 200 may include sensor 210, communication processor 220, payment card processor 230, NFC tag processor 240, display 250, and main processor 260.

Sensor 210 may sense multifunction smart card 100 located within a predetermined distance. For example, when a user touches multifunction smart card 100 to user terminal 200, sensor 210 detects such presence of multifunction smart card 100. Furthermore, when sensor 210 senses multifunction smart card 100, sensor 210 may activate at one of payment card processor 230 and NFC tag processor 240 according to an operation mode of user terminal 200.

Communication processor 220 may communicate with multifunction smart card 200 based on a predetermined protocol and using predetermined radio frequency (RF) bands. For example, communication processor 220 may employ ISO-14443 for communication between user terminal 200 and multifunction smart card 100. Furthermore, a 13.56 MHz band may be used for communication therebetween. Furthermore, communication processor 220 may communicate with related servers such as payment processing server 300 and NFC tag processing server 400 through network 500.

Payment card processor 230 may perform operations for processing a payment made through multifunction smart card 100. For example, payment card processor 230 may be activated when user terminal 200 operates as a payment processing mode and when multifunction smart card 100 is sensed. Upon the activation, payment card processor 230 may communicate with multifunction smart card 100 through communication processor 220 to obtain payment service ID information and associated payment information from multifunction smart card 100.

For example, payment card processor 230 may obtain the payment service ID information stored in the first memory sector in memory 120 of multifunction smart card 100. Payment card processor 230 may also obtain associated payment information from memory sectors of memory 120, which are mapped to the obtained payment service ID information.

When the payment service ID information is not stored in the first memory sector in memory 120, payment card processor 230 may obtain the payment service ID information and the associated payment information from predetermined memory sectors of memory 120, except the first memory sector. Such predetermined memory sectors may be defined and appointed by a related international standard organization or an associated service provider group. For example, such predetermined memory sectors may be any memory sectors, except the first memory sector. In this case, the first memory sector of memory 120 stores NFC tag ID information in order to enable user terminal 200 to recognize multifunction smart card 100 as a NFC tag.

After obtaining the payment service ID information and the associated payment information, payment card processor 230 may extract necessary information for processing the payment made through multifunction smart card 100 and communicate with related payment processing server 300 through communication processor 220. Based on the extracted information, payment card processor 230 may process the payment in cooperation with related payment processing server 300 by exchanging the extracted information to each other. Such extracted information may include a type of a payment card, an associated bank account, a credit card numbers, an expiration date, a remaining value, and so forth. The present invention, however, is not limited thereto.

NFC tag processor 240 may perform operations for recognizing multifunction smart card 100 as a NFC tag, reading associated NFC tag contents, processing the NFC tag contents, and writhing new NFC tag contents in multifunction smart card 100. For example, NFC tag processor 240 may be activated when user terminal 200 operates as a NFC tag processing mode and when multifunction smart card 100 is sensed. Upon the activation, NFC tag processor 240 may communicate with multifunction smart card 100 through communication processor 220 to obtain NFC tag ID information and associated NFC tag content information from multifunction smart card 100.

For example, NFC tag processor 240 may obtain the NFC tag ID information (i.e., NDEF AID) at the first memory sector in memory 120 of multifunction smart card 100. In this case, the payment service ID information and the associated payment information are stored in the predetermined memory sectors of memory 120. Further, NFC tag processor 240 may obtain associated NFC tag contents information stored in memory sectors of memory 120, which are associated with the NFC tag ID information.

When the NFC tag ID information is not stored in the first memory sector in memory 120, NFC tag processor 240 may invoke a NFC tag applet implemented in multifunction smart card 100 based on related international smart card standards. The NFC tag applet may be a program designed and implemented based on the Global Platform to be executed from NFC tag processor 240 for enabling user terminal 200 to recognize multifunction smart card 100 as a NFC tag and to obtain the NFC tag content from multifunction smart card 100. NFC tag processor 240 may select an application ID of the NFC tag applet in order to invoice the NFC tag applet. Particularly, such NFC tag applet may be implemented based on NFC forum type 4 tag operation specifications. For example, the NFC tag applet may be assigned with an application ID of D2760000850100 or D2760000850101. NFC tag processor 240 may obtain NFC tag contents information stored in multifunction smart card 100 or write new NFC tag contents information in multifunction smart card 100 through the initiated NFC tag applet in accordance with at least one embodiment.

After obtain the NFC tag contents information, NFC tag processor 240 may determine a content type of the obtained NFC tag contents information. For example, the NFC tag contents information may include various types of data, such as a text, a song, a musical tone, an image, a moving image, a web address with a service identification (ID), and so forth. According to the content type, NFC tag processor 240 may control other constituent elements of user terminal 200 to perform different operations in cooperation with main processor 260 and a related server (i.e., NFC tag processing server 400). For example, NFC tag processor 240 may perform operations based on the determined content type of the obtained NFC tag content. For example, when the content type of the obtained NFC tag content is a web address such as a universal resource locator (URL) address, NFC tag processor 240 accesses a related server of the web address, receives web contents from the related server through communication processor 220, and displays the web contents on display 210. Furthermore, when the determined content type of the obtained NFC tag content is a text, an image, a music, or multimedia files, NFC tag processor 240 may display texts or images on display 210 and play back songs and musical tones through output units (now shown) of user terminal 200 based on the obtained NFC tag. In addition, such determined content type may be a set of instructions to perform specific operation. In this case, NFC tag processor 240 may perform operations in cooperation with a related server based on the set of instructions. For example, NFC tag processor 240 accesses an associated server, requests specific contents, obtains the requested contents from the server, and performs operation based on the obtained contents, such as playing back movie clips, songs, advertisement moving pictures, or the combination thereof. That is, NFC tag processor 240 provides a related NFC tag service based on the NFC tag content stored in multifunction smart card 100 in accordance with at least one embodiment of the present invention.

Display 250 may be an interface between a user and user terminal 200 to show information to the user. Such information may include user inputs received from input units (not shown) of user terminal 200, various types of user interfaces such as an operating system user interface and user interfaces for a payment processing service and a NFC tag processing service, and a result of processing in response to user inputs. Display 250 may perform such a display operation in response to control of at least one of payment card processor 230, NFC tag processor 240, and main processor 260.

Main processor 260 may perform general operations for controlling user terminal 200. Main processor 260 may control other constituent elements including sensor 210, communication processor 220, payment card processor 230, NFC tag processor 240, and display 250.

As described above, multifunction smart card 100 has a memory structure that interacts with user terminal 200 as a NFC tag as well as a payment card in accordance with at least one embodiment. Particularly, multifunction smart card 100 may store a NFC tag ID such as an NDEF AID in a MAD format at the first sector (i.e., $0^{th}$ sector or MAD sector) of a MIFARE® classic memory and store a payment service ID information at predetermined sectors thereof, for example, the $14^{th}$ sector (S13) or the $15^{th}$ sector (S14) of a MIFARE® classic memory. Alternatively, instead of storing the NFC tag ID (i.e., NEDE AID) in the first sector, a NFC tag applet may be implemented in multifunction smart card 100 based on the international smart card standards, such as Global Platform, and initiated when service terminal 200 operates as a NFC tag mode. In this case, the payment service ID information is stored at the first sector (i.e., $0^{th}$ sector) in a MIFARE® classic memory.

When a smart card is a MIFARE® type contactless card or when a smart card is equipped with a MIFARE® chip, such a smart card cannot be used a NFC tag and a payment card at the same time because the first sector of the MIFARE® class memory is occupied by a payment service ID information which is stored in various different formats according to an associated service provider or an associated country. In order for a user terminal to recognize such a MIFARE® type contactless card as a NFC tag, the first sector (i.e., $0^{th}$) of a memory of a MIFARE® class chip has to store a NDEF AID in a MAD format.

In accordance with at least one embodiment, a method may be provided for using such, MIFARE® type contactless card (i.e., multifunction smart card 100) as a NFC tag and a payment card at the same time. For example, a NDEF AID is stored at the first sector of the, MIFARE® Classic format memory in a MAD format and payment service ID information is stored in the other sectors of the, MIFARE® Classic formation memory, for example, the $14^{th}$ sector or the $15^{th}$ sector. Alternatively, a NFC tag applet may be implemented and driven in a multifunction smart card based on Global Platform standards and payment service ID information is stored at the first sector of the, MIFARE® Classic Memory.

In order to interact with such multifunction smart card 100, user terminal 200 may determine what information is stored in a predetermined memory sector (i.e., the first sector of a memory) of multifunction smart card 100 and recognize smart card 100 as at least one of a payment card and a NFC tag according to the determined information type. Such operation will be described in more detail with reference to FIG. 8 and FIG. 9.

Figure 8:
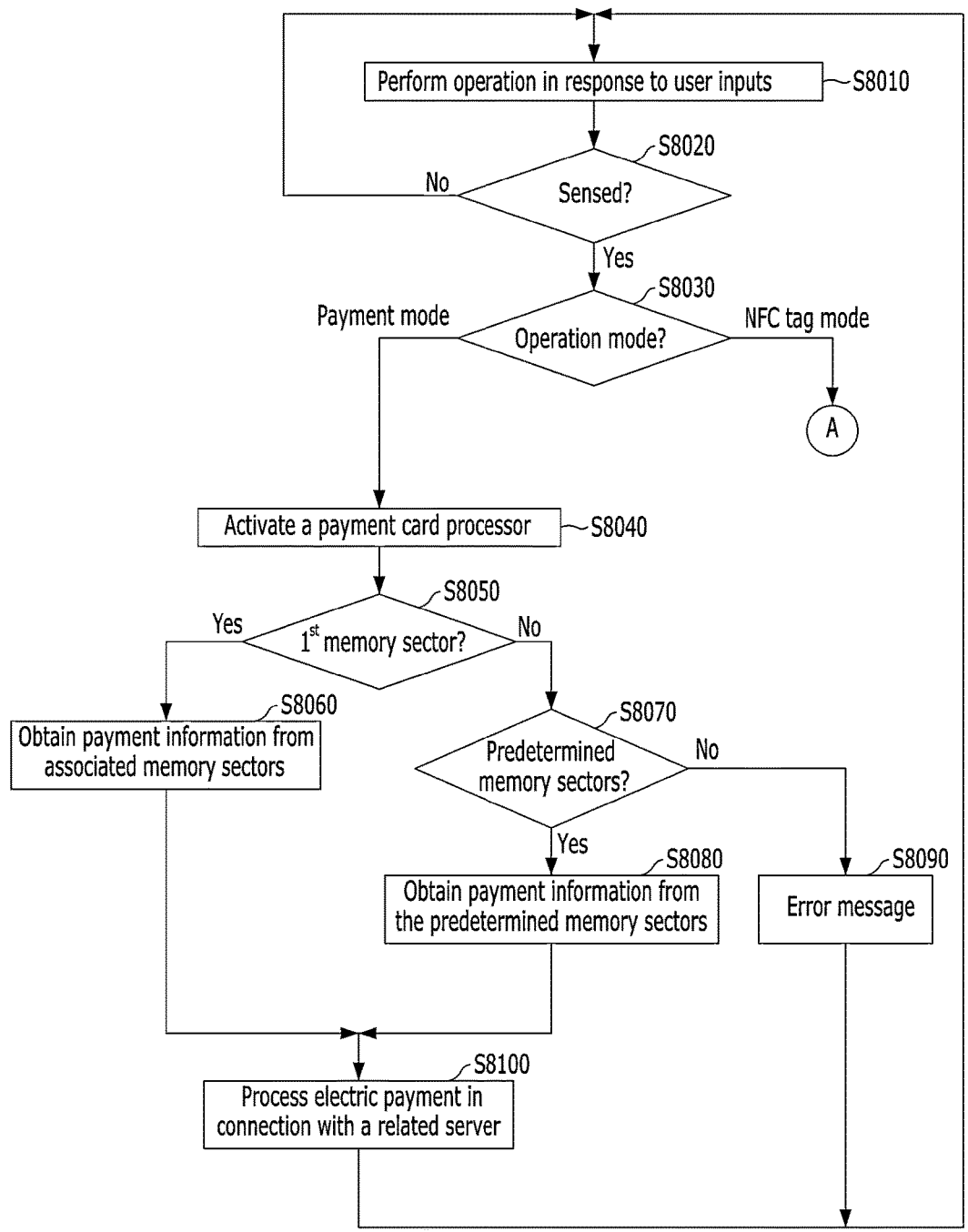
FIG. 8 and FIG. 9 show operation of a user terminal for providing a NFC tag service and a payment service through single contactless smart card in accordance with at least one embodiment of the present invention.
Figure 9:
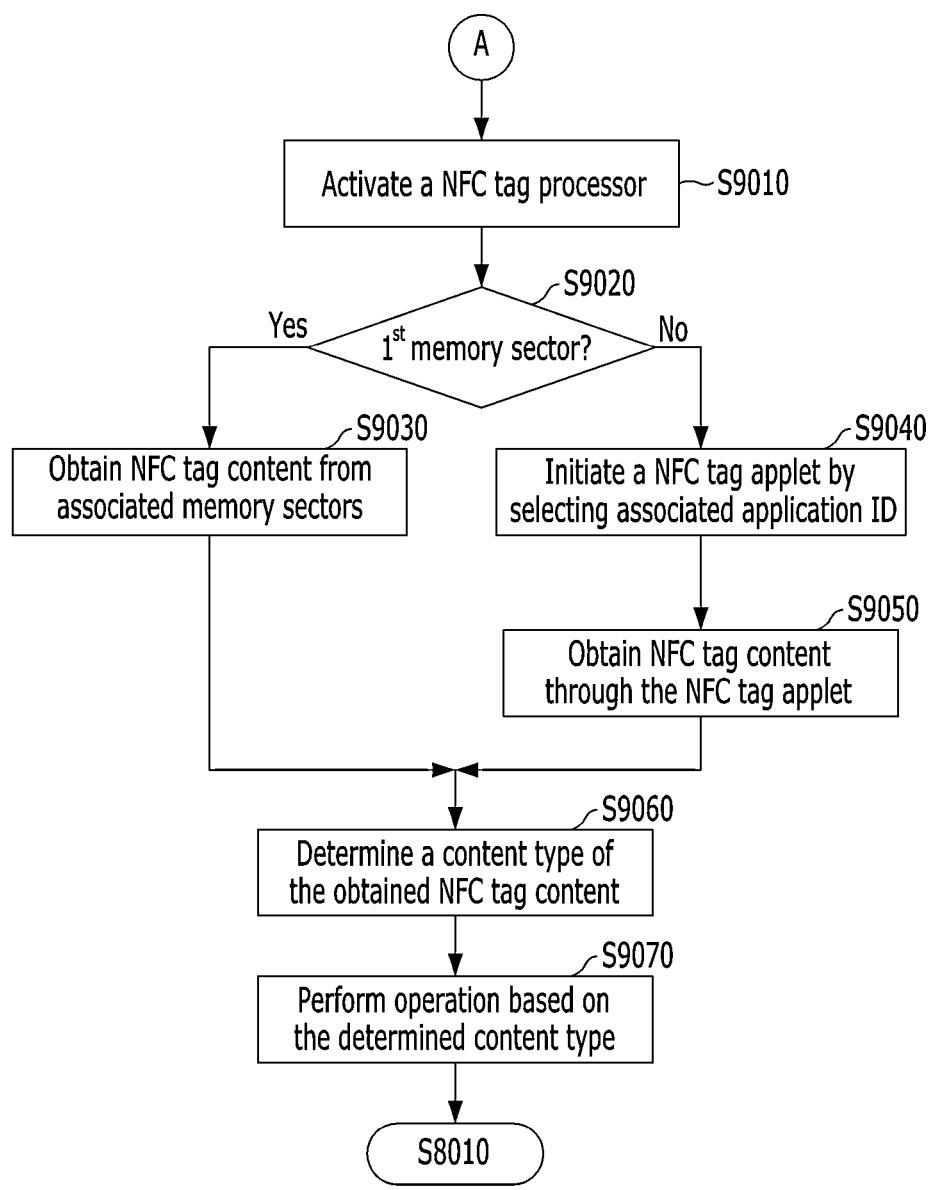

FIG. 8 and FIG. 9 show operation of a user terminal for providing a NFC tag service and a payment service through single contactless smart card in accordance with at least one embodiment of the present invention.

Referring to FIG. 8, user terminal 200 is activated and performs operation in response to user inputs at step S8010. User terminal 200 may be any device capable of communicating with an associated server and perform functions for providing a payment service and a NFC tag service in connection with the associated server. For example, user terminal 200 may be a smart phone, a handheld computer, a laptop, a tablet PC, a pad-like device and so forth. Furthermore, user terminal 200 may be capable of recognizing a smart card as a NFC tag, as well as a payment card, when the smart card stores a NDEF AID at the first sector of a MIFARE® Classic format memory or when the smart card having a NFC tag applet implemented based on Global Platform standard.

At step S8020, user terminal 200 regularly scans a surrounding area to detect any smart card located within a predetermined distance. For example, when a user touches multifunction smart card 100 to user terminal 200, user terminal 200 detects multifunction smart card 100. Such detection mechanism and communication mechanism may be performed based on ISO/IEC 14443, but the present invention is not limited thereto.

When multifunction smart card 100 is not sensed (No-S8020), user terminal 200 continuously performs operations associated with user inputs and regularly scans the surrounding areas for detecting a smart card at steps S8010 and S8020.

When multifunction smart card 100 is sensed (Yes-S8020), user terminal 200 determines whether an operation mode thereof is a payment card processing mode or a NFC tag processing mode at step S8030. For example, user terminal 200 may be a dedicated contactless payment card reader such as a cash register or a point of sale (POS) device or a computing device capable of performing various functions including a payment card processing function, such as a computer with a contactless smart card reader, a handheld device, a pad-like device, and a smart phone having a contactless smart card reader. If user terminal 200 is the dedicated contactless payment card reader, this step might be omitted. Otherwise, user terminal 200 determines whether an operation mode thereof is a payment card processing mode or a NFC tag processing mode when user terminal 200 detects multifunction smart card 100.

When the operation mode of user terminal 200 is determined as the payment card processing mode (Payment Mode-S8030), user terminal 200 activates a payment card processor at step S8040. That is, user terminal 200 initiates a payment service procedure when it operates as the payment card processing mode. For example, when a customer may touch smart card 100 to user terminal 200 for making a payment, user terminal 200 may activate a payment card processing procedure. Such payment card processing procedure may include reading payment information from multifunction smart card 100 and processing such electric payment based on the read payment information in connection with an associated server.

At step S8050, payment card processor 230 of user terminal 20 determines whether payment service ID information is stored in the first sector of memory 120 of multifunction smart card 100. As described, the first sector is the $0^{th}$ sector in a MIFARE® class memory.

When the payment service ID information is stored in the first sector (Yes-S8050), payment card processor 230 of user terminal 200 obtains (i.e., read) associated payment information from memory sectors mapped with the payment service ID information at step S8060. For example, payment card processor 230 of user terminal 200 may extract necessary information for performing an electric payment service from the payment service ID information and the associated payment information stored in memory sectors mapped to the payment service ID information. The associated payment information may include information on a type of a payment card, an associated bank account, a credit card numbers, an expiration date, a remaining value, and so forth. The present invention, however, is not limited thereto. Any information for providing an electric payment service will be included in the payment service ID information and the associated payment information.

When the payment service ID information is not stored in the first sector (No-S8050), payment card processor 230 of user terminal 200 determines whether the payment service ID information and/or the payment information are stored in predetermined memory sectors at step S8070. For example, such predetermined memory sectors for storing the payment service ID information may be decided and appointed by a related international standard organization and an associated service provider group. Particularly, the predetermined memory sectors for storing the payment service ID information may be at least one of $14^{th}$ and $15^{th}$ memory sectors (S13 and S14), but the present invention is not limited thereto. Any memory sectors, except the $1^{st}$ memory sector (S0), can be the predetermined memory sectors for storing the payment service ID information and the associated payment information. Accordingly, user terminal 200 may check the $14^{th}$ and $15^{th}$ memory sectors for the payment service ID information and/or the associated payment information.

When the payment service ID information is not stored at the predetermined memory sectors, payment card processor 230 of user terminal 200 may display an error message through a display unit at step S8090. When the payment service ID information is stored at the predetermined memory sectors, user terminal 200 reads the payment information at step S8080. For example, user terminal 200 may obtain at least one of the payment service ID information and the associated payment information and extract necessary information for performing an electric payment service from the payment service ID information and the associated payment information.

At step S8100, payment card processor 230 of user terminal 200 performs operations for processing the electric payment based on the obtained information in connection with an associated server (i.e., payment processing server 300).

As described above, when the operation mode of user terminal 200 is determined as the payment card processing mode at step S8030, user terminal 200 obtains the payment service ID information and the associated payment service information from one of the first sector and the predetermined memory sectors of memory 120.

When the operation mode of user terminal 200 is determined as the NFC tag processing mode (NFC tag mode-S8030), NFC tag processor 240 may be activated at step S9010 as shown in FIG. 9.

Referring to FIG. 9, at step S9020, NFC tag processor 240 of user terminal 200 may determine whether the first sector of the memory stores a NFC tag ID (i.e., NDEF AID) or not. When the NFC tag ID (i.e., NDEF AID) is stored at the first sector (Yes-S9020), NFC tag processor 240 of user terminal 200 may obtain NFC tag content directly from memory sectors associated with the NFC tag ID (i.e., NDEF AID) at step S9030. For example, NFC tag processor 240 may determine associated memory sectors based on the NFC tag ID (i.e., NDEF AID) stored in the first sector. Then, NFC tag processor 240 may read associated NFC tag content from the determined memory sectors.

When the NFC tag ID is not stored at the first sector (No-S9020), NFC tag processor 240 of user terminal 200 may initiate a NFC tag applet implemented in multifunction smart card 100 at step S9040. For example, the NFC tag applet may be a program designed and implemented based on a Global Platform to be executed from NFC tag processor 240 for enabling user terminal 200 to recognize multifunction smart card 100 as a NFC tag and to obtain the NFC tag content from multifunction smart card 100. Such NFC tag applet may be implemented in multifunction smart card 100 and initiated by selecting an application ID thereof in cooperation with an operating system of multifunction smart card 100. Particularly, the NFC tag applet may be implemented based on NFC forum type 4 tag operation specifications. For example, the NFC tag applet may be assigned with an application ID of D2760000850100 or D2760000850101. NFC tag processor 240 might select one of the application IDs to invoke the NFC tag applet.

At step S9050, NFC tag processor 240 obtains associated NFC tag content through the initiated NFC tag applet. For example, the initiated NFC tag applet may fetch an associated NFC tag content stored in predetermined memory sectors in multifunction smart card 100 and provide the fetched NFC tag content to NFC tag processor 240.

At step S9060, NFC tag processor 240 of user terminal 200 determines a content type of the obtained NFC tag content. For example, the NFC tag content may include various types of data, such as a text, a song, a musical tone, an image, a moving image, a web address with a service identification (ID), and so forth. According to the content type, user terminal 200 may perform different operations in cooperation with a related server (i.e., NFC tag processing server 400).

At step S9070, NFC tag processor 240 may perform operations based on the determined content type of the obtained NFC tag content. For example, when the content type of the obtained NFC tag content is a web address such as a universal resource locator (URL) address, NFC tag processor 240 accesses a related server of the web address, receives web contents from the related server, and displays the web contents on display 210 of user terminal 200. Furthermore, when the determined content type of the obtained NFC tag content is a text, an image, a music, or multimedia file, NFC tag processor 240 may display the NFC tag content on display 210 and plays the NFC tag contents based on the content type. For example, NFC tag processor 240 displays texts or images on display 210 and plays back songs and musical tones based on the obtained NFC tag. In addition, such determined content type may be a set of instructions to perform specific operation. In this case, NFC tag processor 240 may perform operations in cooperation with a related server based on the set of instructions. For example, NFC tag processor 240 accesses an associated server, requests specific contents, obtains the requested contents from the server, and performs operation based on the obtained contents, such as playing back movie clips, songs, advertisement moving pictures, or the combination thereof. That is, NFC tag processor 240 provides a related NFC tag service based on the NFC tag content stored in multifunction smart card 100 in accordance with at least one embodiment of the present invention.

As described, user terminal 200 may be embodied to recognize two types of multifunction smart cards; one having a NDEF AID stored at the first sector of a MIFARE® Classic memory; and the other having a NFC tag applet implemented based on global platform standards instead of storing the NDEF AID. However, the present invention is not limited thereto. User terminal 200 may be embodied to recognize only one type of the multifunction smart cards. For example, user terminal 200 may be embodied to recognize a smart card having a NFC tag applet implemented based on Global Platform standards while storing payment service ID information at the first memory sector. Such user terminal 200 in accordance with another embodiment will be described with reference to FIG. 10.

Figure 10:
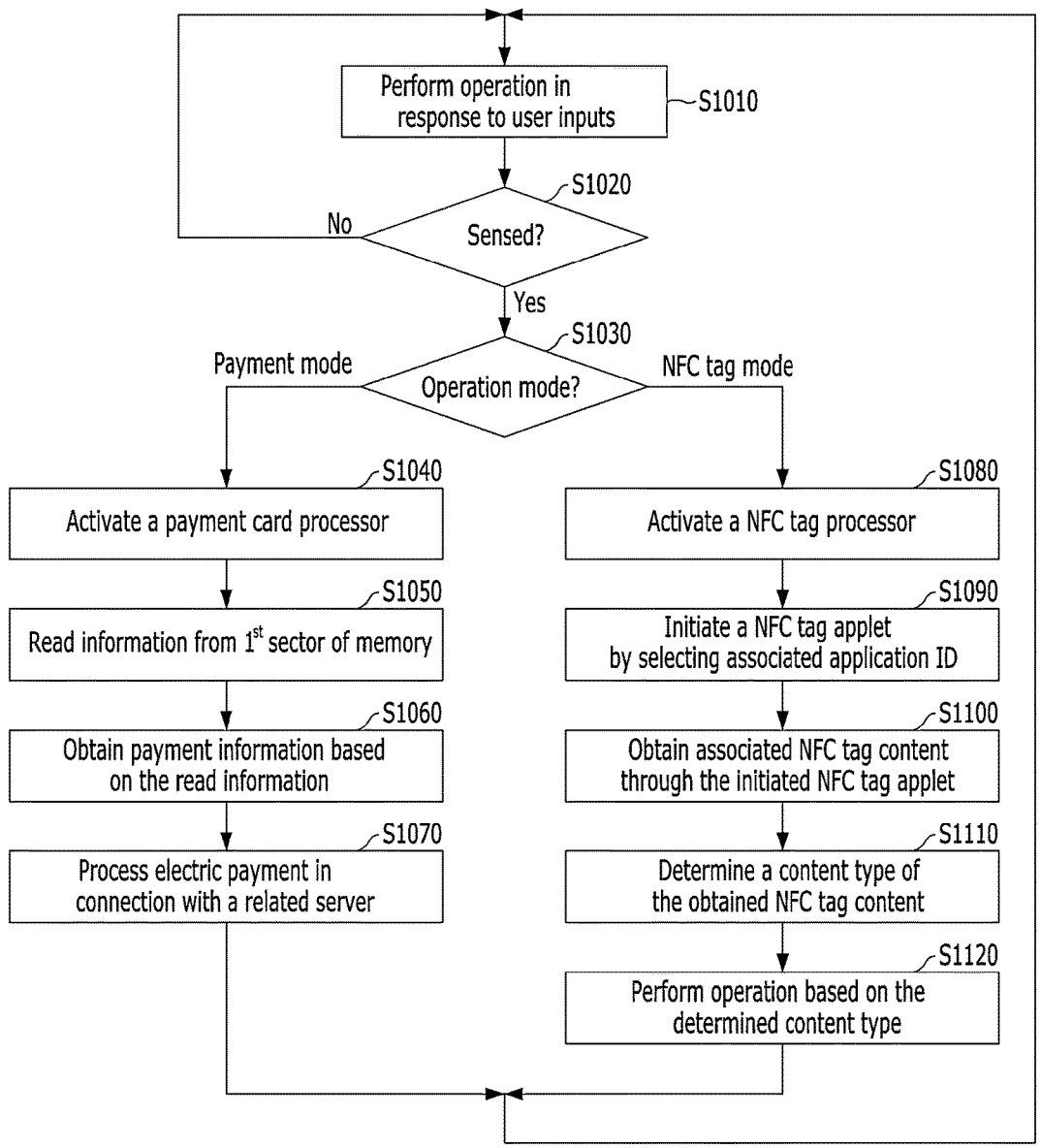
FIG. 10 shows operation of a user terminal for providing a NFC tag service and a payment service through single contactless smart card in accordance with another embodiment of the present invention.

FIG. 10 shows operation of a user terminal for providing a NFC tag service and a payment service through single contactless smart card in accordance with another embodiment of the present invention.

Referring to FIG. 10, user terminal 200 is activated and performs operation in response to user inputs at step S1010. At step S1020, user terminal 200 regularly scans a surrounding area to detect any smart card located within a predetermined distance. When multifunction smart card 100 is not sensed (No-S1020), user terminal 200 continuously performs operations associated with user inputs and regularly scans the surrounding areas for detecting a smart card at steps S1010 and S1020.

When multifunction smart card 100 is sensed (Yes-S1020), user terminal 200 determines whether an operation mode thereof is a payment card processing mode or a NFC tag processing mode at step S1030. When the operation mode of user terminal 200 is determined as the payment card processing mode (Payment Mode-S1030), user terminal 200 activates a payment card processor at step S1040. That is, user terminal 200 initiates a payment service procedure when it operates as the payment card processing mode. For example, when a customer may touch smart card 100 to user terminal 200 for making a payment, user terminal 200 may activate a payment card processing procedure. Such payment card processing procedure may include reading payment information from multifunction smart card 100 and processing such electric payment based on the read payment information in connection with an associated server.

At step S1050, payment card processor 230 of user terminal 20 reads payment service ID information from the first memory sector of memory 120 of multifunction smart card 100. At step S1060, payment card processor 230 of user terminal 200 obtains (e.g., reads) associated payment information from memory sectors mapped with the payment service ID information.

At step S1070, payment card processor 230 of user terminal 200 performs operations for processing the electric payment based on the obtained information in connection with an associated server (i.e., payment processing server 300).

When the operation mode of user terminal 200 is determined as the NFC tag processing mode (NFC tag mode-S1030), NFC tag processor 240 may be activated at step S1080. At step S1090, NFC tag processor 240 of user terminal 200 may initiate a NFC tag applet implemented in multifunction smart card 100 at step S1090. For example, the NFC tag applet may be a program designed and implemented based on a Global Platform to be executed from NFC tag processor 240 for enabling user terminal 200 to recognize multifunction smart card 100 as a NFC tag and to obtain the NFC tag content from multifunction smart card 100. Such NFC tag applet may be implemented in multifunction smart card 100 and initiated by selecting an application ID thereof in cooperation with an operating system of multifunction smart card 100. Particularly, the NFC tag applet may be implemented based on NFC forum type 4 tag operation specifications. For example, the NFC tag applet may be assigned with an application ID of D2760000850100 or D2760000850101. NFC tag processor 240 might select one of the application IDs to invoke the NFC tag applet.

At step S1100, NFC tag processor 240 obtains associated NFC tag content through the initiated NFC tag applet. For example, the initiated NFC tag applet may fetch an associated NFC tag content stored in predetermined memory sectors in multifunction smart card 100 and provide the fetched NFC tag content to NFC tag processor 240.

At step S1110, NFC tag processor 240 of user terminal 200 determines a content type of the obtained NFC tag content. For example, the NFC tag content may include various types of data, such as a text, a song, a musical tone, an image, a moving image, a web address with a service identification (ID), and so forth. According to the content type, user terminal 200 may perform different operations in cooperation with a related server (e.g., NFC tag processing server 400).

At step S1120, NFC tag processor 240 may perform operations based on the determined content type of the obtained NFC tag content. For example, when the content type of the obtained NFC tag content is a web address such as a universal resource locator (URL) address, NFC tag processor 240 accesses a related server of the web address, receives web contents from the related server, and displays the web contents on display 210 of user terminal 200. Furthermore, when the determined content type of the obtained NFC tag content is a text, an image, a music, or multimedia file, NFC tag processor 240 may display the NFC tag content on display 210 and plays the NFC tag content based on the content type. For example, NFC tag processor 240 displays texts or images on display 210 and plays back songs and musical tones based on the obtained NFC tag. In addition, such determined content type may be a set of instructions to perform specific operation. In this case, NFC tag processor 240 may perform operations in cooperation with a related server based on the set of instructions. For example, NFC tag processor 240 accesses an associated server, requests specific contents, obtains the requested contents from the server, and performs operation based on the obtained contents, such as playing back movie clips, songs, advertisement moving pictures, or the combination thereof. However, the present invention is not limited thereto. The NFC tag service may be provided with various types of data and ways.

As described, user terminal 200 may be embodied to recognize a smart card having NFC tag ID information (i.e., NDEF AID) stored at the first sector of a MIFARE® classic format memory and a payment service ID information stored at predetermined other sectors which are decided and appointed by a related international standard organization or an associated service provider group. Such user terminal 200 in accordance with still another embodiment will be described with reference to FIG. 11.

Figure 11:
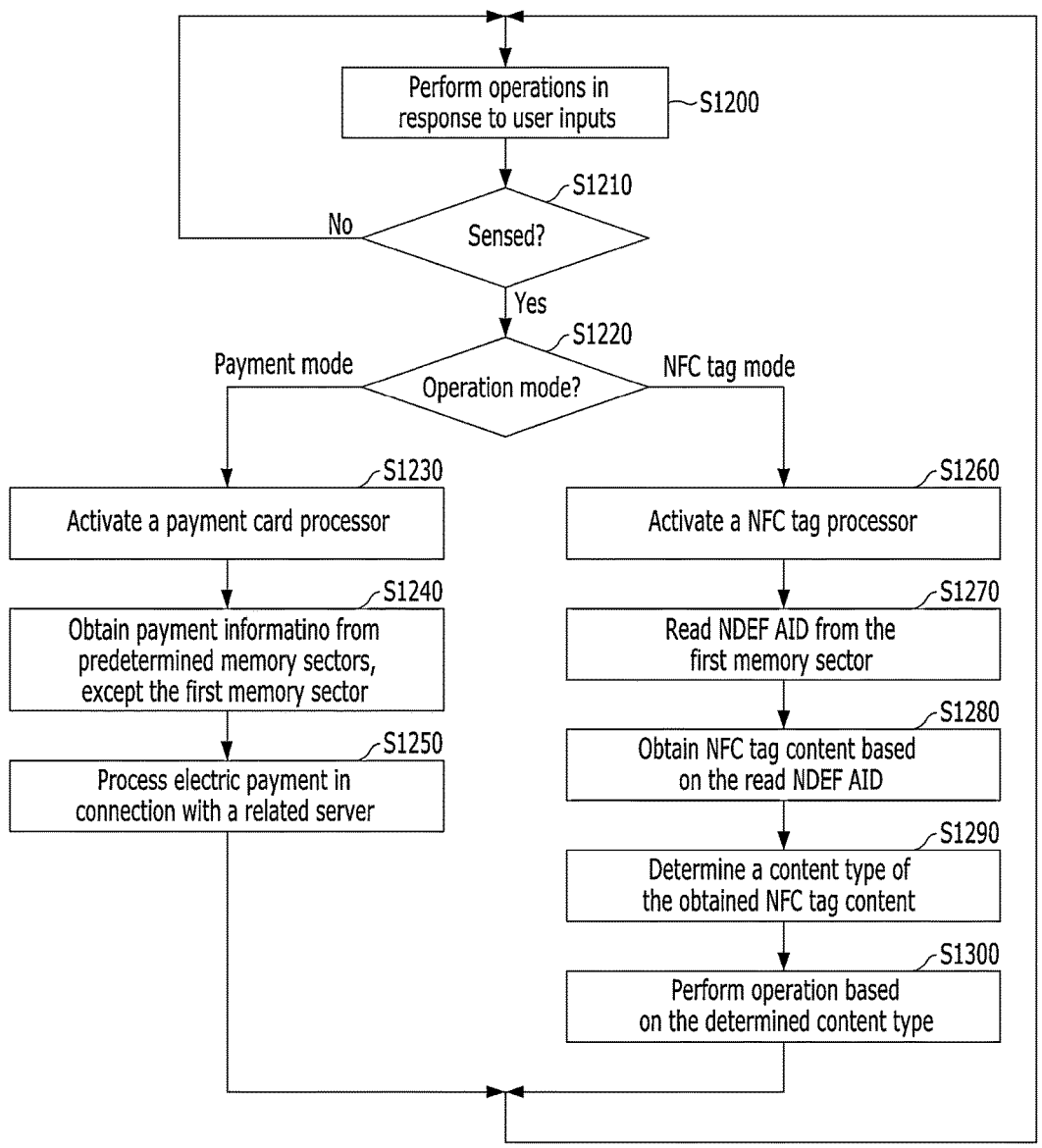
FIG. 11 shows operation of a user terminal for providing a NFC tag service and a payment service through single contactless smart card in accordance with still another embodiment of the present invention.

FIG. 11 shows operation of a user terminal for providing a NFC tag service and a payment service through single contactless smart card in accordance with still another embodiment of the present invention.

Referring to FIG. 11, user terminal 200 is activated and performs operation in response to user inputs at step S1200. At step S1210, user terminal 200 regularly scans a surrounding area to detect any smart card located within a predetermined distance. When multifunction smart card 100 is not sensed (No-S1210), user terminal 200 continuously performs operations associated with user inputs and regularly scans the surrounding areas for detecting a smart card at steps S1200 and S1210.

When multifunction smart card 100 is sensed (Yes-S1210), user terminal 200 determines whether an operation mode thereof is a payment card processing mode or a NFC tag processing mode at step S1220. When the operation mode of user terminal 200 is determined as the payment card processing mode (Payment Mode-S1220), user terminal 200 activates a payment card processor at step S1230. That is, user terminal 200 initiates a payment service procedure when it operates as the payment card processing mode. For example, when a customer may touch smart card 100 to user terminal 200 for making a payment, user terminal 200 may activate a payment card processing procedure. Such payment card processing procedure may include reading payment information from multifunction smart card 100 and processing such electric payment based on the read payment information in connection with an associated server.

At step S1240, payment card processor 230 of user terminal 200 reads payment service ID information and associated payment information from predetermined memory sectors, except the first memory sector, of memory 120 of multifunction smart card 100. At step S1250, payment card processor 230 of user terminal 200 performs operations for processing the electric payment based on the obtained information in connection with an associated server (i.e., payment processing server 300).

When the operation mode of user terminal 200 is determined as the NFC tag processing mode (NFC tag mode-S1220), NFC tag processor 240 may be activated at step S1260. At step S1270, NFC tag processor 240 of user terminal 200 may read NDEF AID from the first memory sector (S0) of memory 120. At step S1280, NFC tag processor 240 of user terminal 200 may obtain NFC tag contents stored in memory sectors associated with the NDEF AID.

At step S1290, NFC tag processor 240 of user terminal 200 determines a content type of the obtained NFC tag contents. For example, the NFC tag content may include various types of data, such as a text, a song, a musical tone, an image, a moving image, a web address with a service identification (ID), and so forth. According to the content type, user terminal 200 may perform different operations in cooperation with a related server (e.g., NFC tag processing server 400).

At step S1300, NFC tag processor 240 may perform operations based on the determined content type of the obtained NFC tag content. For example, when the content type of the obtained NFC tag content is a web address such as a universal resource locator (URL) address, NFC tag processor 240 accesses a related server of the web address, receives web contents from the related server, and displays the web contents on display 210 of user terminal 200. Furthermore, when the determined content type of the obtained NFC tag content is a text, an image, a music, or multimedia file, NFC tag processor 240 may display the NFC tag content on display 210 and plays the NFC tag contents based on the content type. For example, NFC tag processor 240 displays texts or images on display 210 and plays back songs and musical tones based on the obtained NFC tag. In addition, such determined content type may be a set of instructions to perform specific operation. In this case, NFC tag processor 240 may perform operations in cooperation with a related server based on the set of instructions. For example, NFC tag processor 240 accesses an associated server, requests specific contents, obtains the requested contents from the server, and performs operation based on the obtained contents, such as playing back movie clips, songs, advertisement moving pictures, or the combination thereof. However, the present invention is not limited thereto. The NFC tag service may be provided with various types of data and delivered in various ways.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

The present invention can be embodied in the form of methods and apparatuses for practicing those methods. The present invention can also be embodied in the form of program code embodied in tangible media, non-transitory media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

No claim element herein is to be construed under the provisions of 35 U.S.C. § 112, sixth paragraph, unless the element is expressly recited using the phrase "means for" or "step for."

Although embodiments of the present invention have been described herein, it should be understood that the foregoing embodiments and advantages are merely examples and are not to be construed as limiting the present invention or the scope of the claims. Numerous other modifications and embodiments can be devised by those skilled in the art that will fall within the spirit and scope of the principles of this disclosure, and the present teaching can also be readily applied to other types of apparatuses. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A smart card comprising:
   a memory configured to store one of identification (ID) information of a payment card and ID information of a near field communication (NFC) tag at a first memory sector and to store associated information for providing a related service as the payment card and the NFC tag at predetermined memory sectors; and
   a control processor configured to operate with a NFC tag applet invoked in response to an associated selection signal from a user terminal when the user terminal operates in a NFC tag processing mode and when the smart card is set as the payment card by storing the ID information of the payment card in the first memory sector of the memory, and to provide the ID information of the NFC tag and the associated information of the NFC tag to the user terminal by the invoked NFC tag applet
   wherein the memory has a predetermined classic format and the first memory sector is an Application identifier sector.

2. The smart card of claim 1, wherein the smart card is configured to, while recognized as the NFC tag, store the ID information for the payment card at the first memory sector in the memory.

3. The smart card of claim 1, wherein the smart card is configured to, while recognized as the payment card, store the ID information for the NFC tag at the first memory sector in the memory.

4. The smart card of claim 1, wherein the memory is configured to store both the NFC tag ID information and the payment card ID information as the ID information for the NFC tag and the payment card.

5. The smart card of claim 4, wherein the NFC tag ID information is a NFC data exchange format application identifier (NDEF AID).

6. The smart card of claim 1, wherein the memory is configured to:

store NFC tag ID information at the first memory sector as the ID information for the NFC tag; and store payment service ID information as the ID information for the payment card and store associated payment information at predetermined memory sectors, other than at the first memory sector.

7. The smart card of claim 6, wherein the predetermined memory sectors are defined and appointed by at least one of a related international smart card organization and a related service provider group.

8. The smart card of claim 1, wherein:
the control processor is configured to invoke the NFC tag applet in response to the selection signal that selects an application identifier of the NFC tag applet; and
the user terminal transmits the selection signal when the memory stores payment service ID information at the first memory sector.

9. The smart card of claim 1, wherein the NFC tag applet provides NFC tag ID information and associated NFC tag contents information to the user terminal.

10. The smart card of claim 1, wherein the NFC tag applet is a program implemented within the control processor based on related international smart card standards including a Global Platform.

11. The smart card of claim 1, wherein the NFC tag applet is implemented based on a NFC forum type 4 tag operation specifications.

12. A method of a user terminal for providing one of a payment processing service and a near field communication (NFC) tag processing service through single smart card, the method comprising:
recognizing, as a NFC tag, the smart card set as a payment card by invoking a NFC tag applet implemented with the smart card when the user terminal operates in a NFC tag processing mode, wherein the smart card set as the payment card stores identification (ID) information of the payment card at a first memory sector; and
recognizing, as a payment card, the smart card set as a NFC tag by reading information stored in a predetermined memory sector different from the first memory sector when the user terminal operates in a payment processing mode wherein the smart card set as the NFC tag stores ID information of the NFC tag at the first memory sector,
wherein the memory has a predetermined classic format and the first memory sector is an Application identifier sector.

13. The method of claim 12, wherein the recognizing the smart card as a NFC tag includes:
determining whether the first memory sector of the memory stores NFC tag ID information or payment service ID information;
initiating the NFC tag applet implemented in the smart card when the first memory sector stores the payment service ID information; and
recognizing the smart card as the NFC tag based on information obtained through the NFC tag applet.

14. The method of claim 13, comprising:
obtaining NFC tag content information stored in the smart card through the NFC tag applet;
determining a content type of the obtained NFC tag content information; and
providing a NFC tag processing service based on the determined content type and the obtained NFC tag content information.

15. The method of claim 12, wherein the recognizing the smart card as a payment card includes:
determining whether the first memory sector of the memory stores NFC tag ID information or payment service ID information;
obtaining the payment service ID information and associated payment information from predetermined memory sectors of the memory of the smart card;
recognizing the smart card as the obtained payment service ID information; and
providing the payment processing service based on the obtained payment information in cooperation with a related server.

16. The method of claim 12, comprising;
regularly scanning a surrounding area to sense the smart card;
determining an operation mode of the user terminal between the payment processing mode and the NFC tag processing mode, when the smart card is sensed;
in a payment processing mode, activating a payment card processor for recognizing the smart card as the payment card when ID information of the NFC tag is stored in the first memory sector of the memory in the smart card; and
in a NFC tag processing mode, activating a NFC tag processor for recognizing the smart card as a NFC tag when identification (ID) information of a payment card is stored in the first memory sector of the memory in the smart card.

17. A user terminal of providing a payment processing service and a near field communication (NFC) tag processing service through single smart card, the user terminal comprising:
a sensor configured to regularly scan surrounding area for sensing the smart card and to transmit an activation signal according to an operation mode of the user terminal;
a payment card processor configured to be activated in response to the activation signal from the sensor when the operation mode of the user terminal is a payment processing mode and to recognize, as a payment card, the smart card setup as a NFC tag by reading information stored in a predetermined memory sector of a memory in the smart card when identification (ID) information of the NFC tag is stored in a first memory sector of the memory in the smart card; and
a NFC tag processor configured to be activated in response to the activation signal from the sensor when the operation mode of the user terminal is a NFC tag processing mode and to recognize, as the NFC tag, the smart card setup as the payment card by invoking a NFC tag applet implemented with the smart card when ID information of the payment card is stored in the first memory sector of the memory in the smart card,
wherein the memory has a predetermined classic format and the first memory sector is an Application identifier sector.

18. The user terminal of claim 17, wherein the NFC tag processor is configured to:
determine whether the first memory sector of the memory stores NFC tag ID information or payment service ID information;
initiate the NFC tag applet implemented in the smart card when the first memory sector stores the payment service ID information;
recognize the smart card as the NFC tag based on information obtained through the NFC tag applet;
obtain NFC tag content information stored in the smart card through the NFC tag applet;

determine a content type of the obtained NFC tag content information; and provide the NFC tag processing service based on the determined content type and the obtained NFC tag content information.

19. The user terminal of claim 17, wherein the payment card processor is configured to:

determine whether the first memory sector of the memory stores NFC tag ID information or payment service ID information;

obtain the payment service ID information and associated payment information from predetermined memory sectors of the memory of the smart card;

recognize the smart card as the obtained payment service ID information; and provide the payment processing service based on the obtained payment information in cooperation with a related server.

* * * * *